(12) United States Patent
Tung

(10) Patent No.: US 6,948,058 B2
(45) Date of Patent: Sep. 20, 2005

(54) METHOD AND DEVICE FOR PLAYING MULTIMEDIA FILES IN SEMI-POWER ON STATE OF A COMPUTER

(75) Inventor: Chung-Chih Tung, Taipei (TW)

(73) Assignee: Mitac Technology Corp. (TW)

( * ) Notice: Subject to any disclaimer, the term of this patent is extended or adjusted under 35 U.S.C. 154(b) by 586 days.

(21) Appl. No.: 10/205,300

(22) Filed: Jul. 26, 2002

(65) Prior Publication Data

US 2004/0019811 A1 Jan. 29, 2004

(51) Int. Cl.[7] .......................................... G06F 15/177
(52) U.S. Cl. ............................... 713/2; 713/1; 713/601
(58) Field of Search ........................ 713/1, 2, 100, 713/600, 601

(56) References Cited

U.S. PATENT DOCUMENTS

| | | | |
|---|---|---|---|
| 6,003,131 A | * 12/1999 | Lee et al. | 713/2 |
| 6,446,215 B1 | * 9/2002 | Meyer et al. | 713/310 |
| 6,477,642 B1 | * 11/2002 | Lupo | 713/2 |
| 6,591,358 B2 | * 7/2003 | Jaffrey | 712/32 |

* cited by examiner

Primary Examiner—Dennis M. Butler
(74) Attorney, Agent, or Firm—Harness, Dickey & Pierce, P.L.C.

(57) ABSTRACT

This specification discloses a method and device for playing multimedia files in a semi-power on state of a computer. A program is provided in the BIOS so that POST (Power On Self Test) is not performed after the power is turned on. The program directly initializes multimedia chips or chipsets. A micro controller is provided as the interface for the CPU to control to execute the commands given by its user. Finally, the processed result is presented by a player. Through the simple method, the user can make the computer play multimedia files directly, achieving the goal of a computer with the home electronics functions.

17 Claims, 4 Drawing Sheets

METHOD AND DEVICE FOR PLAYING MULTIMEDIA FILES IN SEMI-POWER ON STATE OF A COMPUTER

BACKGROUND OF THE INVENTION

1. Field of Invention

The invention pertains to a method and device for playing multimedia files in the semi-power on state of a computer and, in particular, to a method and device that enable a user to use a computer to play multimedia files without entering its usual operating system.

2. Related Art

There are two major methods for viewing or listening computer multimedia files. With reference to FIG. 1, a computer user can use a CD-ROM driver to read files from an optical recording medium 100. The operating system 210 of the computer is an interface for the user to key in operating commands through a keyboard or mouse, running some multimedia player 230 in order to watch or listen to beautiful images or music through a player 130. Unlike normal home electronics (such as TVs and stereo systems), such a process is very tedious and requires some basic computer knowledge from the user. The other method is to use a MP3 player or video player. With reference to FIG. 2, an optical recording medium 100 is inserted into any of the above-mentioned devices. Using their own operating panel 120, the user can also enjoy wonderful images and music using a player 130 with a decoding circuit 110. Although these devices are as convenient as normal home electronics, it is still very uneconomical for computer users to purchase such additional devices if one can achieve the same objective using the computer.

SUMMARY OF THE INVENTION

In view of the foregoing, an objective of the invention is to extend the functions of computers so that they can be used just like home electronics. Users can operate the computers in a way similar to operating common home electronics when playing multimedia files.

In accord with the above-mentioned objective, we provide a method and device for playing multimedia files in a semi-power on state of the computer. A special program is provided in the BIOS (Basic Input/Output System). If a user turns on the computer with the intention of simply playing multimedia files, then the BIOS does not perform the POST (Power-On Self-Test) but directly initializes multimedia chips or chipsets. A micro controller is employed as the interface between the user and the disclosed device. The CPU (Central Processing Unit) controls the micro controller to execute commands given by the user. The processed results are then presented through a player.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 3:
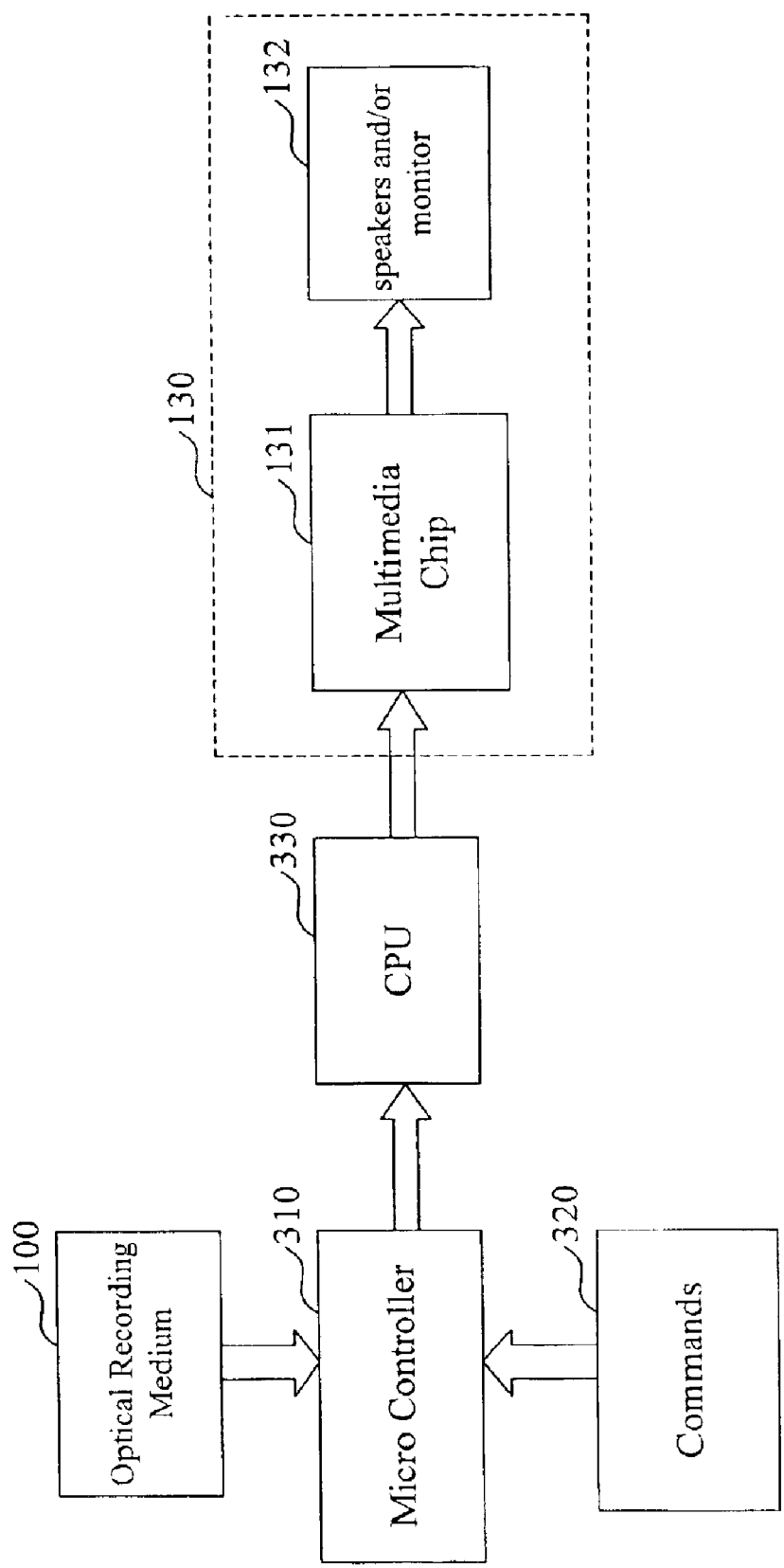
FIG. 3 is a block diagram of playing multimedia files using the disclosed device.

With reference to FIG. 3, a micro controller 310 is used in the invention as an interface between a user and an optical recording medium 100 during the playing process. Multimedia hot keys are provided on input devices such as the usual keyboard or mouse in a way similar to those on the conventional MP3 player or video player, so that the user can give commands 320 through the corresponding keys on the input devices. According to the commands 320, the micro controller 310 is used as an interface to access files in the optical recording medium 100 in the CD-ROM driver. The files are then sent to the CPU 330 for further operations. The processed files are then played by a player 130. The player includes a multimedia chip 131 (such as an audio or video chip) and an output device 132 (such as speakers and/or monitor). Therefore, the data processed by the CPU 330 are played through conversions by the multimedia chip 131 and an appropriate output device.

Figure 1:
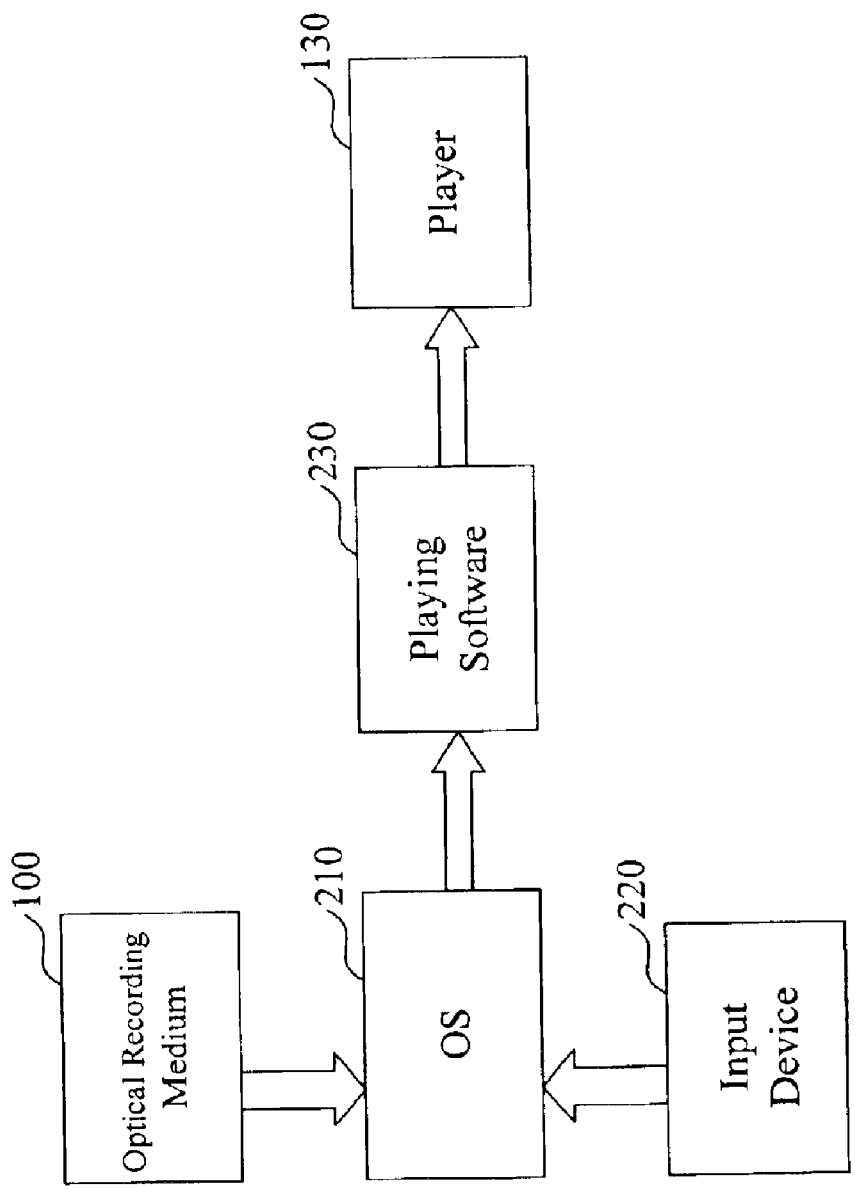
FIG. 1 is a block diagram of playing multimedia files using a conventional computer operating system.
Figure 2:
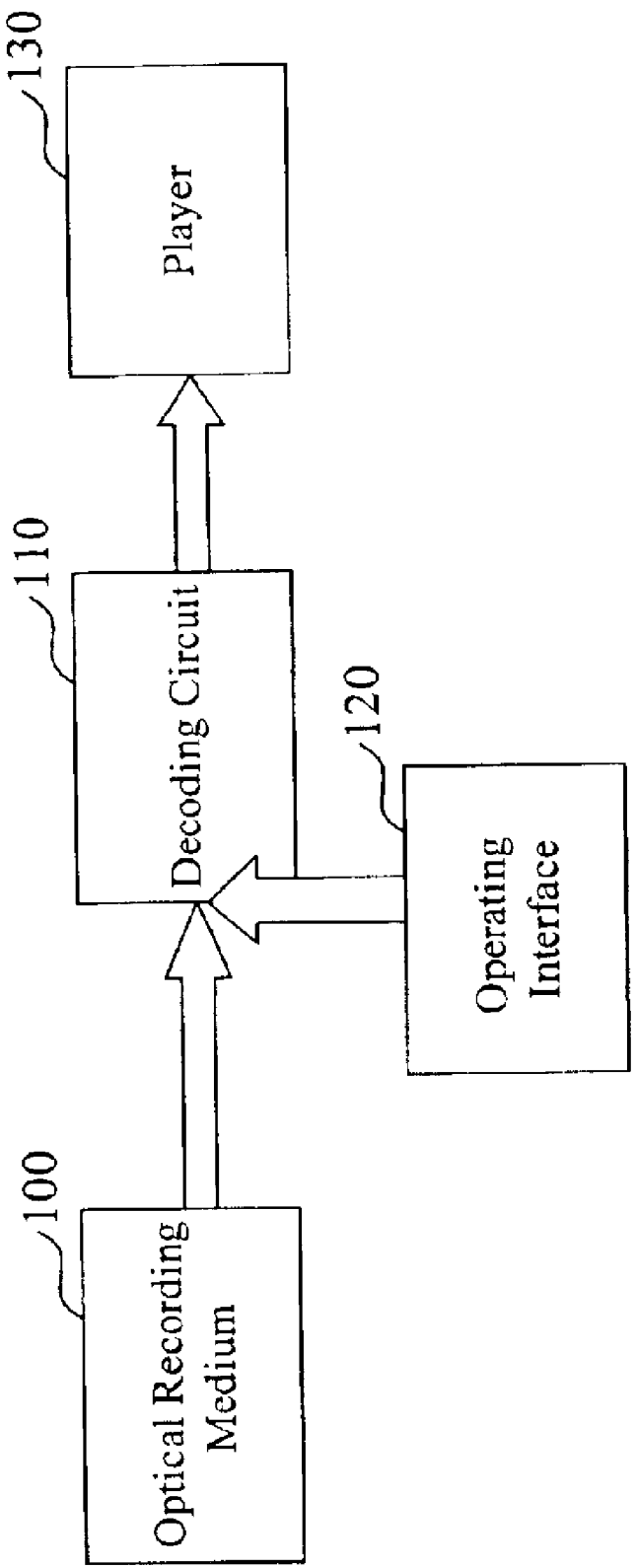
FIG. 2 is a block diagram of playing music using a conventional MP3 player.

Comparing FIGS. 2 and 3, one can see that the above-mentioned multimedia file playing process in FIG. 3 is very similar to that in FIG. 2. The invention uses the micro controller 310 as an operating interface 120 to receive commands sent from the user. The CPU 330 plays the role of a decoding circuit 110. The decoded data are sent to the player 130 for presentation. However, if one wants to make it as convenient as the conventional MP3 players or video players in operations, the control procedure defined in the BIOS has to be modified. A special program has to be provided in the BIOS so that the power on procedure can be correctly changed.

Figure 4:
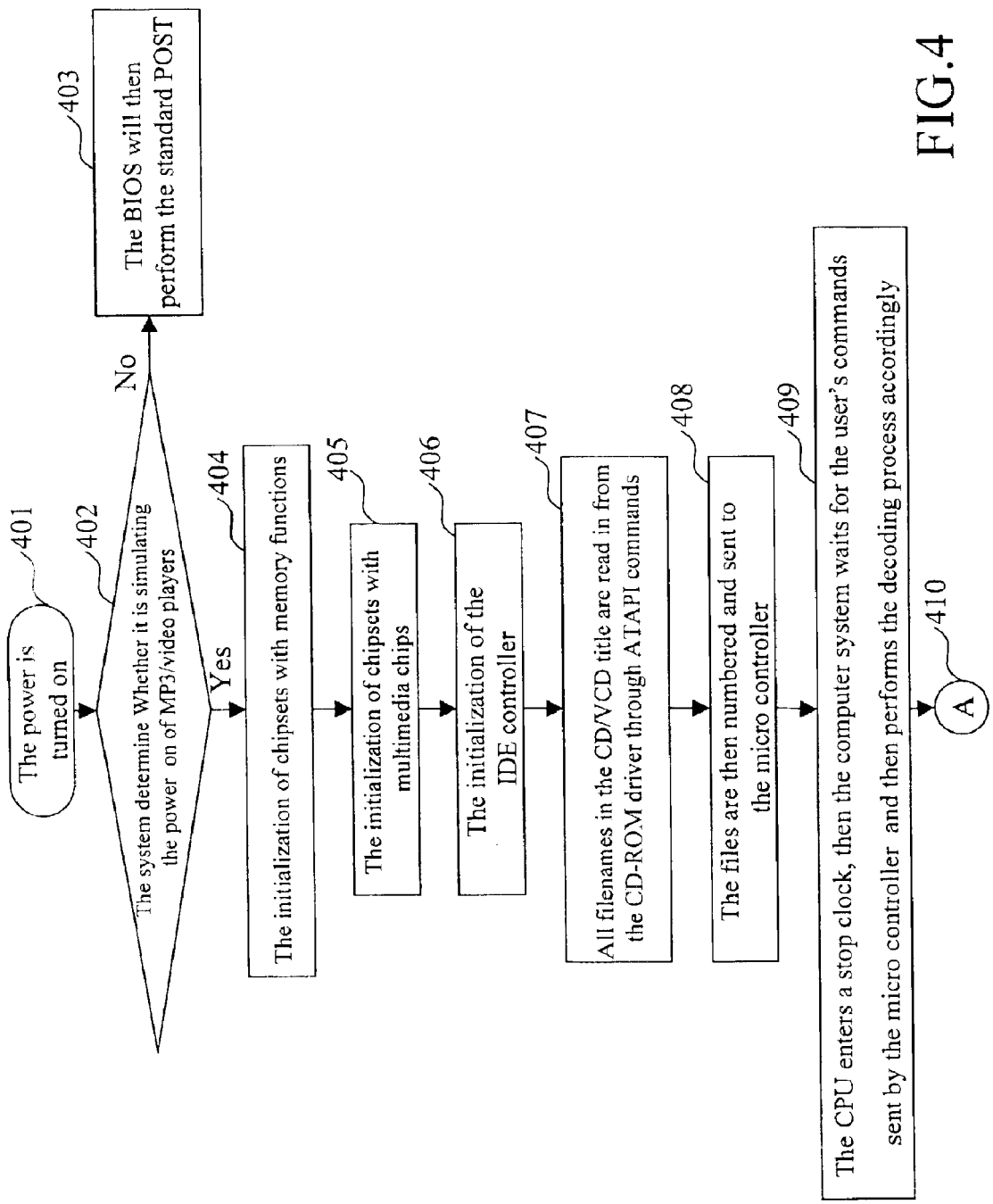
FIG. 4 shows the control procedure of the BIOS according to the invention.

With reference to FIG. 4, when the power is turned on (step 401) the system first determine whether it is simulating the power on of MP3/video players (step 402). The difference is that if the computer is turned on using the conventional ON.OFF button, then it is considered as the usual power on procedure. The BIOS will then perform the standard POST (step 403) and enters the operating system. On the other hand, if the user uses one of the multimedia hot keys provided on the keyboard or mouse to turn on the computer power, then it is considered as the power on procedure to use the computer as an MP3 or video player. The BIOS then determines not to start the POST procedure and not to enter the operating system, but directly initialize multimedia chips or chipsets. This includes the initialization of chipsets with memory functions (step 404), of multimedia chips (audio chip and/or video chip) (step 405), and the IDE controller (step 406). Afterwards, all filenames in the CD/VCD title are read in from the CD-ROM driver through ATAPI commands (step 407). The files are then numbered and sent to the micro controller 310 (step 408). The CPU enters a stop clock state (step 409). The above-mentioned steps are controlled by the program installed in the BIOS. After this procedure is done, the conventional BIOS task is brought to an end. At this moment, the computer system waits for the user's commands 320 sent by the micro controller 310 and then performs the decoding process accordingly.

Effects of the Invention

In the modern society, computer equipment becomes more popular. It can be seen that computers may become as popular as televisions so that every family at least owns one. However, the multimedia-related operations on computers are not as easy as conventional home electronics. Using the disclosed method and device, one does not need to spend additional money to purchase, for example, MP3 or video players but still is able to play multimedia files as easy as using televisions or stereo systems. The invention can achieve the objective of making computers have the home electronics functions.

Certain variations would be apparent to those skilled in the art, which variations are considered within the spirit and scope of the claimed invention.

What is claimed is:

1. A method for playing multimedia files in a semi-power on state of a computer for the computer to automatically play multimedia files without starting its operating system, the method comprising the steps of:
   - installing a program in the BIOS (Basic Input/Output System) of the computer so that related chips/chipsets are initialized after the computer power is turned on;
   - reading the filenames of all files on an optical recording medium through ATAPI commands, numbering the filenames, sending the filenames to a micro controller, and making the CPU (Central Processing Unit) enter a stop clock state;
   - sending a command from the micro controller to the CPU to make the CPU perform file decoding; and
   - sending the CPU decoded result to a player.

2. The method of claim 1, wherein the BIOS performs a normal POST (Power-On Self-Test) when the computer is not turned on in an MP3/video player mode.

3. The method of claim 1, wherein the initialized chips/chipsets include random access memory (RAM), multimedia chips and IDE controllers.

4. The method of claim 1, wherein the command sent from the micro controller to the CPU is determined by a command entered by a user.

5. The method of claim 4, wherein the user's command is entered via an input device selected from the group consisting of a keyboard and a mouse.

6. The method of claim 1 further comprising the step of sending the CPU into a stop clock state so that the BIOS does not perform the POST and enter the operating system.

7. The method of claim 1, wherein the player includes multimedia chips and output devices.

8. The method of claim 7, wherein the multimedia chips includes audio and video chips.

9. The method of claim 7, wherein the output devices includes speakers and monitors.

10. A device for playing multimedia files in a semi-power on state of a computer for the computer to automatically play multimedia files without starting its operating system, the device comprising:
    - a CD-ROM driver, which reads multimedia files in an optical recording medium;
    - an input device, which allows a user to enter commands to play the multimedia files;
    - a central processing unit (CPU), which executes the commands given by the user to process the multimedia files;
    - a micro controller, which functions as an interface between the user, the optical recording medium, and the CPU;
    - a basic input/output system (BIOS), which is coded with a program for controlling the initialization of multimedia chips/chipsets directly after the power is turned on, sends multimedia file numbers to the micro controller, and sends the CPU into a stop clock state; and
    - a player, which plays the multimedia files processed by the CPU.

11. The device of claim 10, wherein the BIOS performs a normal POST (Power-On Self-Test) when the computer is not turned on in a MP3/video player mode.

12. The device of claim 10, wherein the initialized chips/chipsets include random access memory (RAM), multimedia chips and IDE controllers.

13. The device of claim 10, wherein the input device is selected from the group consisting of a keyboard and a mouse.

14. The device of claim 10, wherein the CPU is sent into a stop clock state so that the BIOS does not perform the POST and enter the operating system.

15. The device of claim 10, wherein the player includes multimedia chips and output devices.

16. The device of claim 15, wherein the multimedia chips include audio and video chips.

17. The device of claim 15, wherein the output devices includes speakers and monitors.

* * * * *